Dec. 26, 1933.  S. DEBUS  1,940,998
BREAD SLICING MACHINE
Filed Dec. 2, 1931  2 Sheets-Sheet 1

Inventor
S. Debus

By Emil F. Lange
Attorney

Dec. 26, 1933.   S. DEBUS   1,940,998
BREAD SLICING MACHINE
Filed Dec. 2, 1931   2 Sheets-Sheet 2

Inventor
S. Debus
By Emil F. Lange
Attorney

Patented Dec. 26, 1933

1,940,998

UNITED STATES PATENT OFFICE 1,940,998

BREAD SLICING MACHINE

Sander Debus, Hastings, Nebr.

Application December 2, 1931. Serial No. 578,478

3 Claims. (Cl. 146—153)

My invention relates to bread slicing machines having for its object the provision of four primary features as follows:

1. An adjustable gravity chute of novel form for conveying the loaves of bread to, through and from the cutting mechanism.

2. Connections between the cutting knives and the cutter frame whereby the knives are readily removable from the frame either individually or collectively.

3. Guide members of novel form for guiding the cutter frames in their reciprocatory movements.

4. A novel form of drive for reciprocating cutter frames whereby the two cutter frames will be moved in unison without any jerking movements and without any slippage between the movements.

It will also be noted that the present machine is designed to be as nearly mechanically perfect as it is possible to make such a machine so that it will give uninterrupted service in even the largest of the bakeries.

Having in view these objects and others which will be pointed out in the following description, I will now refer to the drawings, in which Figure 1 is a view in side elevation of the bread slicing machine, parts being broken away and some of the concealed parts being shown in dotted lines.

Figure 1:
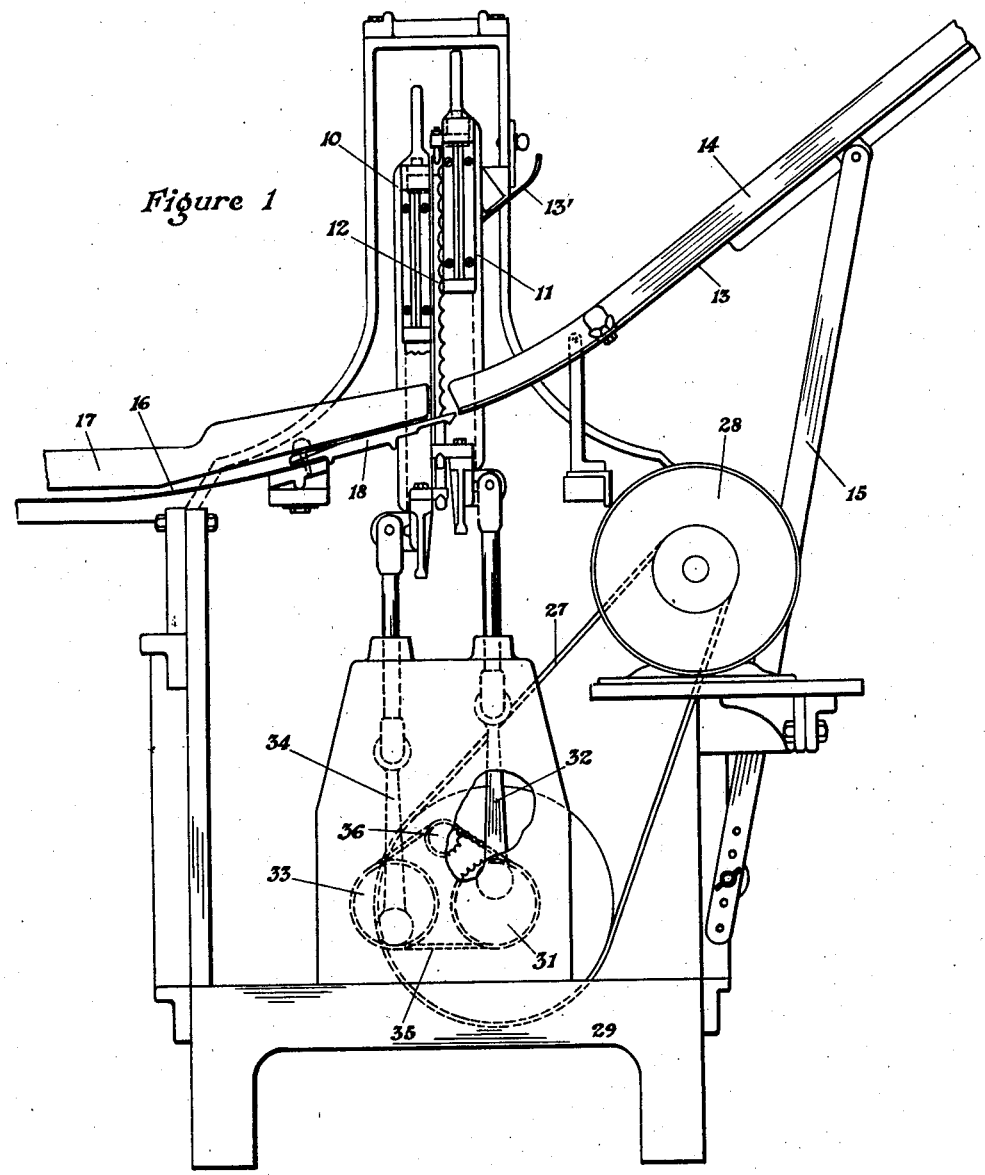
Figure 2:
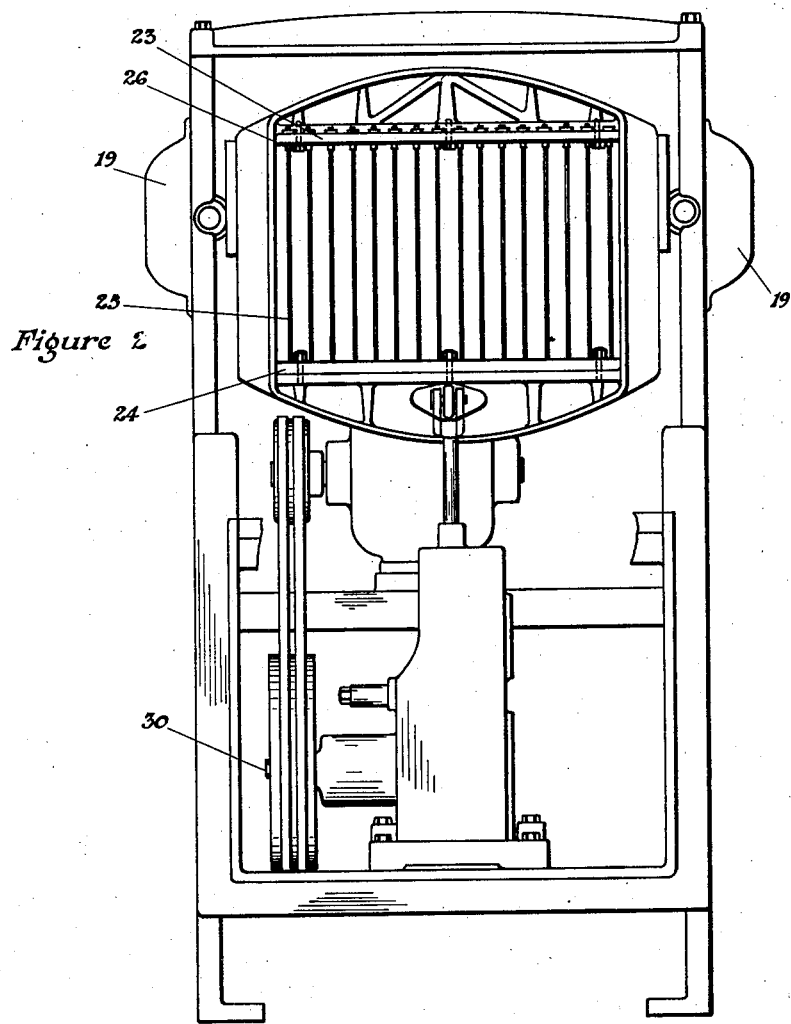
Figure 2 is a view in rear elevation of my bread slicing machine.

The cutter frames are shown at 10 and 11 in Figure 1, their construction being best shown in Figure 2. These two frames are mounted for vertical reciprocatory movement with one of the frames moving upwardly while the other is moving downwardly and vice versa. The frames 10 and 11 are so related to each other that the knives 12 will be in substantially the same plane. As thus far described the construction is common to many other bread cutting devices of the same type.

The loaves of unsliced bread must be fed to these cutters so that they will be delivered from the cutters in sliced form. This is usually accomplished by mechanical conveyors such as endless belts or the like but in the present instance I employ a gravity chute as shown at 13. The floor of the chute is made from material which is as nearly frictionless as possible so that the bread will slide readily over its surface. The chute is also provided with the usual retaining walls 14 at its sides to prevent the loaves from dropping over the edge. The chute is adjustable by means of the adjustable brace 15 so that any desired pitch may be obtained to cause the loaves of bread to slide at the desired speed. The chute 13 delivers the loaves of bread to the cutters 12 which slice the loaves and discharge them onto the second chute 16 also having retaining walls 17. The sliced loaves pass along on the chute 16 from which they may be removed by hand or discharged to the wrapping machine which may be so positioned as to receive the sliced loaves directly from the chute 16. There is thus a slight interruption forming a gap between the chutes 13 and 16 for the passage of the reciprocating knives 12. This gap may be closed so as to form a continuous passageway for the loaves of bread while they are being sliced. The size of the gap between the chutes 13 and 16 will vary to some extent depending on the adjustments. The closure for this gap is shown at 18 which shows one of a plurality of fingers passing between the knives and adjustable to various openings of the gap.

Figure 3:
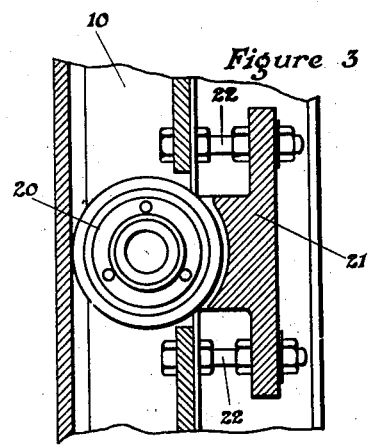
Figure 3 is a vertical transverse sectional view showing the details of the guideway for one of the cutter frames.
Figure 4:
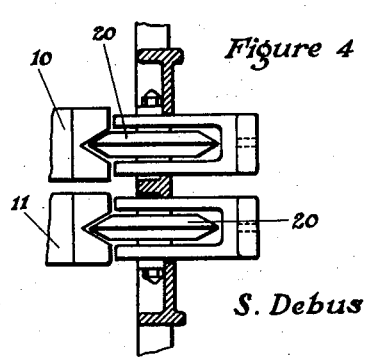
Figure 4 is a view in horizontal section showing a pair of the guideways shown in Figure 3.

The knife frames 10 and 11 are movable at great speed which makes the guiding and the lubrication a very difficult problem in bread slicing machines. Lubrication particularly is open to the serious objection that the lubricant may reach the bread and impart an undesirable taste to it. I have therefore designed adjustable guide members which do not require lubrication but which will function perfectly even at very high speeds. These guide members are best shown in Figures 3 and 4, the positions of the guide members being under the casings 19 in Figure 2. The guide wheels 20 have V-shaped peripheral flanges which seat in V-shaped grooves in the cutter frames 10 and 11. These guide wheels 20 are secured to adjustable brackets 21 and they are provided with ball races or other antifriction devices. The brackets 21 are secured to the machine frame by means of bolts 22 and nuts on the bolts so that the distances between the wheels 20 and the cutter frames may be varied. Both the guide wheels 20 and the grooved portions of the cutter frames are made from steel but the only movable contact between these two members is a rolling contact. Adjustment should allow freedom of movement of the cutter frames without binding but it should be tight enough to prevent any side play.

In prior machines of this type, the cutters are rigidly secured to the cutter frames thus making the replacement of broken knives a very difficult matter. It is also sometimes desirable that the thickness of the slices of bread be varied from the usual thickness. In my construction the cutter frame has a detachable carrier for the knives which are thus indirectly secured to the cutter frame. The upper and lower bars 23 and 24 are secured by means of bolts or the like to the cutter frames from which they are easily detachable. The lower end portions of the knives 25 are secured directly to the lower bar 24. At their upper extremities the knives are provided with cylindrical or rodlike extensions 26 which pass through apertures in the upper bar 23 and which are provided with screw threaded ends for receiving nuts. In the assembled cutter frames and knives, the knives 25 may be properly tensioned by means of the nuts on the knife extensions 26. By having several pairs of bars 23 and 24 with variously spaced knives, it is possible in a few minutes' time to alter the thickness of the slices of bread.

One difficulty encountered in the operation of high speed bread slicing machines has been due to the unequal movements of the two cutter frames relative to each other. I obviate this difficulty by means of a drive which, so far as I am aware, has never heretofore been used on a bread slicing machine. This includes a belt 27 or the like from any suitable source of power such as the motor 28 to a pulley 29 on the shaft 30. The shaft 30 also carries a sprocket wheel 31 which is connected through a pitman 32 to the cutter frame 11. Likewise a second sprocket wheel 33 is connected through a pitman 34 with the cutter frame 10. The two sprocket wheels 31 and 33 are connected to be driven simultaneously and uniformly by means of a sprocket chain 35. In order to still further insure uniformity of movement, there is an idler 36 which maintains the sprocket chain 35 at the proper tension.

I am aware that reciprocatory knives are common in the art of bread slicing machines and I therefore make no claim thereto. The art is well developed but I believe that I have made several important improvements which render a bread slicing machine of this type much more efficient in operation than any of the bread slicing machines heretofore designed. The gravity chute which conducts the bread to, through and from the knives without the use of mechanical power insures a much more perfect delivery than those machines depending on endless belts and other power driven devices. The chute is adjustable to increase or decrease the pitch so that it may be adjusted not only for loaves having different adhesiveness but also for climatic conditions, such as humidity, which affect the adhesiveness of the bread to the floor of the chute. The chute is also provided with side walls 14 for preventing the rapidly moving loaves from sliding off the chute and the bread is further guided by means of a shield 13' which prevents the loaves from being lifted as they enter the knives. Accompanying the adjustment in pitch of the chute is an adjustment which provides a continuous floor for the chute through and between the knives.

Figure 5:
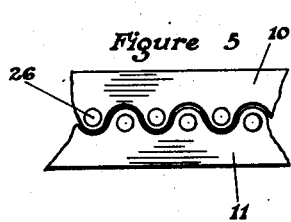
Figure 5 is a diagrammatic view showing in plan fragments of the upper extremities of the cutter frames and showing also the upper ends of the knife members.
Figure 6:
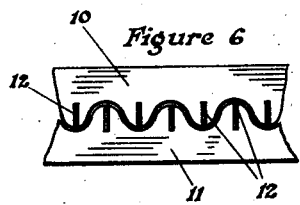
Figure 6 is also a diagrammatic view showing fragments of the two cutter frames at their lower ends and showing also the positions of the knife members.

The knife carrying frames 10 and 11 have the interlocking relation shown in Figure 5. The primary purpose of this is to position all of the knife edges in a common plane. The interlocking arrangement has another function, however. In modern machines of this kind the reciprocatory movements of the cutter frames is exceedingly rapid and this very rapid movement is apt to result in vibrations unless all of the parts are not only carefully machined but also prevented from vibrating due to an interlocking design. The interlocking design shown in Figures 5 and 6 is believed to be superior to previous constructions which attempt to solve the problem but this design is also believed to be novel. These interlocking features also cooperate with the guides at the sides of the knife carrying frames. The guides insure accuracy of movement of the knife carrying frames relative to the main frame of the machine while the interlocking features shown in Figures 5 and 6 insure accuracy of movement of the knife carrying frames 10 and 11 relative to each other. The guides 20 are adjustable to provide the greatest possible ease of movement at any desired speed of movement. They are so designed that lubrication is unnecessary even for the highest possible speeds at which the knife carrying frames are reciprocated.

One great advantage of the present machine is the ease with which knives may be replaced or interchanged. With the prior machines it is a somewhat difficult matter to alter the thickness of the slices of bread and it is also difficult to replace broken knives. My machine is designed to accomplish both of these objects with the greatest possible ease and it is also designed to provide for the adjustable tensioning of the knives.

Machines of this type are driven in various ways, the most common being by means of a crank shaft. The objection to this is that the movement is irregular so that there is no perfect coordination in the movements of the two knife carrying frames. In fact, no machine of this kind appears to have been heretofore designed with reference to the perfect coordination in the movements of the two knife frames. In my construction the use of the two independent sprocket wheels 31 and 33 both driven from the sprocket chain 35 and transmitting energy to the reciprocating knife frames through pitmen insures absolute uniformity in the movements of the knife frames to prevent slippage, back lash and other objectionable features of the prior machines.

Having thus described my invention in such full, clear, and exact terms that its construction and operation will be readily understood by others skilled in the art to which it pertains, what I claim as new and desire to secure by Letters Patent of the United States is:

1. In a bread slicing machine, a plurality of slicing knives and means for conducting loaves of bread to, through and from said knives, said means including an inclined gravity chute having a segment of gradually decreasing pitch for delivering the loaves of bread to said knives, a second segment for conveying the loaves of bread from said knives, one of said segments being adjustable to vary the distance between said segments, and a plurality of fingers positioned between said knives and spanning the gap between said two segments to provide a continuous passageway on said chute.

2. In a bread slicing machine, a plurality of slicing knives and means for conducting loaves of bread to, through and from said knives, said means including an inclined gravity chute having a segment of gradually decreasing pitch for delivering the loaves of bread to said knives, means for adjustably altering the pitch of said chute, a second segment for conveying the loaves of bread from said knives, a plurality of fingers positioned between said knives and spanning the gap between said two segments to provide a continuous passageway on said chute, and means for adjusting said fingers to conform to the adjustment of said first named segment of said chute.

3. In a bread slicing machine, a main frame and a pair of interlocking reciprocatory knife carrying frames, and means for reciprocating said frames, said means including pitmen secured to said knife carrying frames, sprocket wheels to which said pitmen are eccentrically connected, a sprocket chain trained over both of said sprocket wheels, and means for driving said sprocket chain.

SANDER DEBUS.